United States Patent
Nagai

(10) Patent No.: US 9,361,560 B2
(45) Date of Patent: Jun. 7, 2016

(54) PRINTING DEVICE WHICH TRANSMITS DECOMPRESSED DATA TO A STORAGE DEVICE IF A PREDETERMINED CONDITION IS NOT SATISFIED

(71) Applicant: Shohei Nagai, Owariasahi (JP)

(72) Inventor: Shohei Nagai, Owariasahi (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/015,478

(22) Filed: Aug. 30, 2013

(65) Prior Publication Data
US 2014/0063548 A1  Mar. 6, 2014

(30) Foreign Application Priority Data
Aug. 31, 2012 (JP) ................. 2012-191551

(51) Int. Cl.
G06F 3/12 (2006.01)
G06K 15/00 (2006.01)
H04N 1/00 (2006.01)
H04N 1/32 (2006.01)
G06K 15/02 (2006.01)

(52) U.S. Cl.
CPC ............. *G06K 15/40* (2013.01); *G06F 3/122* (2013.01); *G06F 3/1273* (2013.01); *G06F 3/1288* (2013.01); *G06K 15/1886* (2013.01); *G06K 15/4005* (2013.01); *H04N 1/0005* (2013.01); *H04N 1/0009* (2013.01); *H04N 1/00015* (2013.01); *H04N 1/00037* (2013.01); *H04N 1/00082* (2013.01); *H04N 1/32101* (2013.01); *H04N 1/00233* (2013.01); *H04N 1/00244* (2013.01); *H04N 2201/0039* (2013.01); *H04N 2201/0094* (2013.01); *H04N 2201/3202* (2013.01); *H04N 2201/3277* (2013.01); *H04N 2201/3278* (2013.01)

(58) Field of Classification Search
None
See application file for complete search history.

(56) References Cited

U.S. PATENT DOCUMENTS

| | | |
|---|---|---|
| 2007/0133037 A1 | 6/2007 | Arai et al. |
| 2007/0133054 A1 | 6/2007 | Kobayashi et al. |
| 2007/0135930 A1 | 6/2007 | Kirihara et al. |
| 2007/0143361 A1 | 6/2007 | Arai et al. |
| 2008/0212136 A1* | 9/2008 | Namikata ............ 358/1.16 |
| 2009/0161971 A1* | 6/2009 | Nogawa et al. ...... 382/232 |

(Continued)

FOREIGN PATENT DOCUMENTS

| | | |
|---|---|---|
| JP | H-10-187364 A | 7/1998 |
| JP | 2006-303563 A | 11/2006 |

(Continued)

*Primary Examiner* — Vincent Rudolph
*Assistant Examiner* — Richa Mishra
(74) *Attorney, Agent, or Firm* — Scully, Scott, Murphy & Presser, P.C.

(57) ABSTRACT

A printing apparatus including: a receiving unit configured to receive print data; a printing unit configured to print image obtained from decompressed data, which is obtained by decompressing the print data, on a sheet; a transmitting unit configured to transmit data to a storage device to which a log related to printing is configured to be stored; and a control device configured to: decompress the print data into the decompressed data; and determine whether data related to the printing satisfies a predetermined condition; wherein, if the control device determines that the predetermined condition is satisfied, the transmitting unit transmits the print data to the storage device, and if the determining unit determines that the predetermined condition is not satisfied, the transmitting unit transmits the decompressed data to the storage device.

9 Claims, 9 Drawing Sheets

(56) References Cited

U.S. PATENT DOCUMENTS

2010/0157365 A1* 6/2010 Jeong et al. .................. 358/1.15
2010/0188676 A1* 7/2010 Ohashi ........................... 358/1.9
2011/0149344 A1* 6/2011 Nakamura .................... 358/1.15
2011/0279863 A1* 11/2011 Chang et al. ................. 358/1.15

FOREIGN PATENT DOCUMENTS

| JP | 2007-166175 A | 6/2007 |
| JP | 2007-166176 A | 6/2007 |
| JP | 2007-166177 A | 6/2007 |
| JP | 2007-166178 A | 6/2007 |

* cited by examiner

PRINTING DEVICE WHICH TRANSMITS DECOMPRESSED DATA TO A STORAGE DEVICE IF A PREDETERMINED CONDITION IS NOT SATISFIED

CROSS-REFERENCE TO RELATED APPLICATIONS

This application claims priority from Japanese Patent Application No. 2012-191551 filed on Aug. 31, 2012, the entire contents of which are incorporated herein by reference.

TECHNICAL FIELD

Aspects of the present invention relate to a printing apparatus and a printing system.

BACKGROUND

There has been known a printing apparatus in which a printing log, which is related to printing and includes print images, is generated in response to the printing. Also, there has been known a technology for using a memory of a printing apparatus or a server which performs communication connection with a printing apparatus as a storage destination for printing logs.

For example, related-art discloses a technology for generating a job log including a job ID and an apparatus ID and an image log including print images after printing, and storing both the logs in a storage part of a printing apparatus. Further, related-art discloses collectively transmitting the job log and the image log stored in the storage part to a server if a predetermined condition is satisfied.

SUMMARY

However, the above described technology according to the related art has the following problem. That is, the image logs have a tendency to have larger amounts of data as compared to the job logs. For this reason, if many image logs are accumulated in a storage destination for logs, it will occupy a large area of a storage area of the storage destination.

Accordingly, a printing apparatus and a printing system for suppressing a storage area of a storage destination for logs related to printing form being occupied are provided.

According to an aspect of the present invention, there is provided a printing apparatus including: a receiving unit configured to receive print data; a printing unit configured to print image obtained from decompressed data, which is obtained by decompressing the print data, on a sheet; a transmitting unit configured to transmit data to a storage device to which a log related to printing is configured to be stored; and a control device configured to: decompress the print data into the decompressed data; and determine whether data related to the printing satisfies a predetermined condition; wherein, if the control device determines that the predetermined condition is satisfied, the transmitting unit transmits the print data to the storage device, and if the determining unit determines that the predetermined condition is not satisfied, the transmitting unit transmits the decompressed data to the storage device.

According to another aspect of the present invention, there is provided a printing apparatus including: a receiving unit configured to receive print data; a printing unit configured to print image obtained from decompressed data, which is obtained by decompressing the print data, on a sheet; a transmitting unit configured to transmit data to a storage device to which a log related to printing is configured to be stored; and a control device configured to: decompress the print data into the decompressed data; acquire a free space of a storage area of the storage device; and determine whether the acquired free space is equal to or less than a required space; wherein, if the control device determines that the free space is equal to or smaller than the required space, the transmitting unit transmits the print data to the storage device, and if the control device determines that the free space is larger than the required space, the transmitting unit transmits the decompressed data to the storage device.

According to another aspect of the present invention, there is provided a printing system including: a printing apparatus; and a storage device configured to perform communication with the printing apparatus, wherein the printing apparatus includes: a receiving unit configured to receive print data; a printing unit configured to print image obtained from decompressed data, which is obtained by decompressing the print data, on a sheet; a transmitting unit configured to transmit data to the storage device; and a control device configured to: decompress the print data into the decompressed data; and determine whether data related to the printing satisfies a predetermined condition, wherein, if the control device determines that the predetermined condition is satisfied, the transmitting unit transmits the print data to the storage device, and if the determining unit determines that the predetermined condition is not satisfied, the transmitting unit transmits the decompressed data to the storage device, and wherein the storage device includes: a storage-side receiving unit configured to receive the print data or the decompressed data transmitted from the printing apparatus; and a storage area configured to store the data received by the storage-side receiving unit.

Accordingly, a printing apparatus and a printing system which suppress occupying of a large area of a storage area of a storage destination for logs related to printing can be implemented.

DETAILED DESCRIPTION

Hereinafter, an embodiment of a printing system according to the present invention will be described in detail with reference to the accompanying drawings. The present embodiment is obtained by applying the present invention to a printing system including a server and a Multi Function Peripheral (MFP) having an image reading function and an image forming function.

[Configuration of System]

Figure 1:
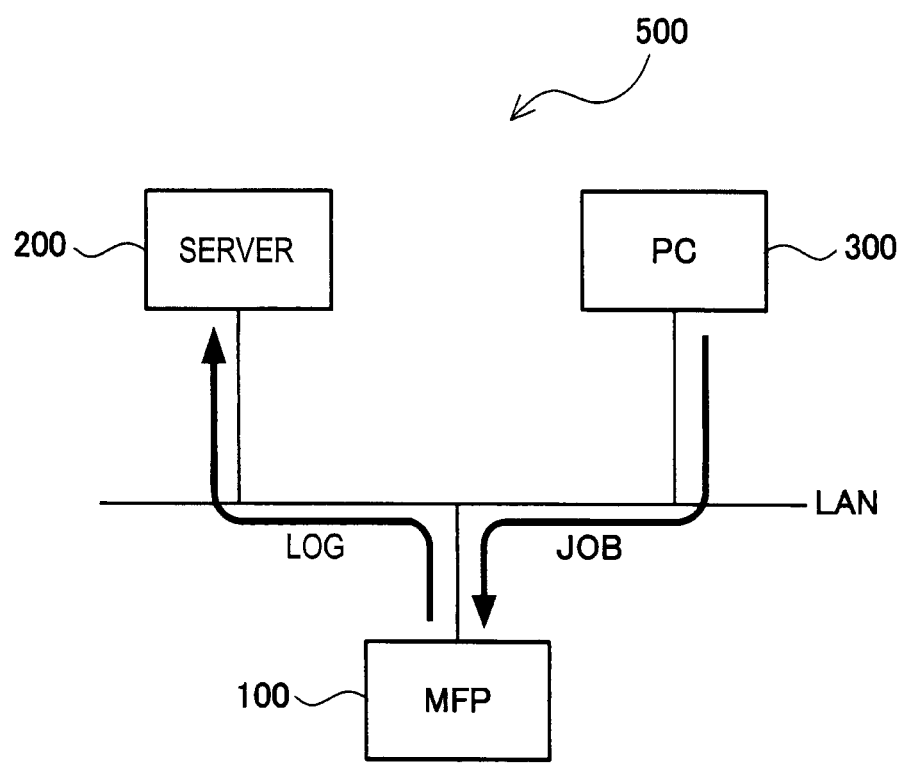
FIG. 1 is a schematic configuration view illustrating a system configuration according to an embodiment.

As shown in FIG. 1, an MFP 100, a server 200, and a PC 300 are connected to one another, thereby constituting a printing system 500 of the present embodiment. The MFP 100 receives a print job from the PC 300, and performs printing on the basis of the received print job, thereby outputting a printed material. Further, the MFP 100 generates a log which is the log of performance of the print job, from the received print job. Then, the MFP 100 transmits the generated log to the server 200.

The server 200 stores the log transmitted from the MFP 100. The PC 300 transmits a print job to the MFP 100 on the basis of an operation of a user. In the present embodiment, the MFP 100 is an example of a printing apparatus, and the server 200 is an example of a storage device. Further, the printing system 500, in which the MFP 100 and the server 200 are connected to each other such that communication is possible, is an example of a printing system.

[Electrical Configuration of MFP]

Figure 2:
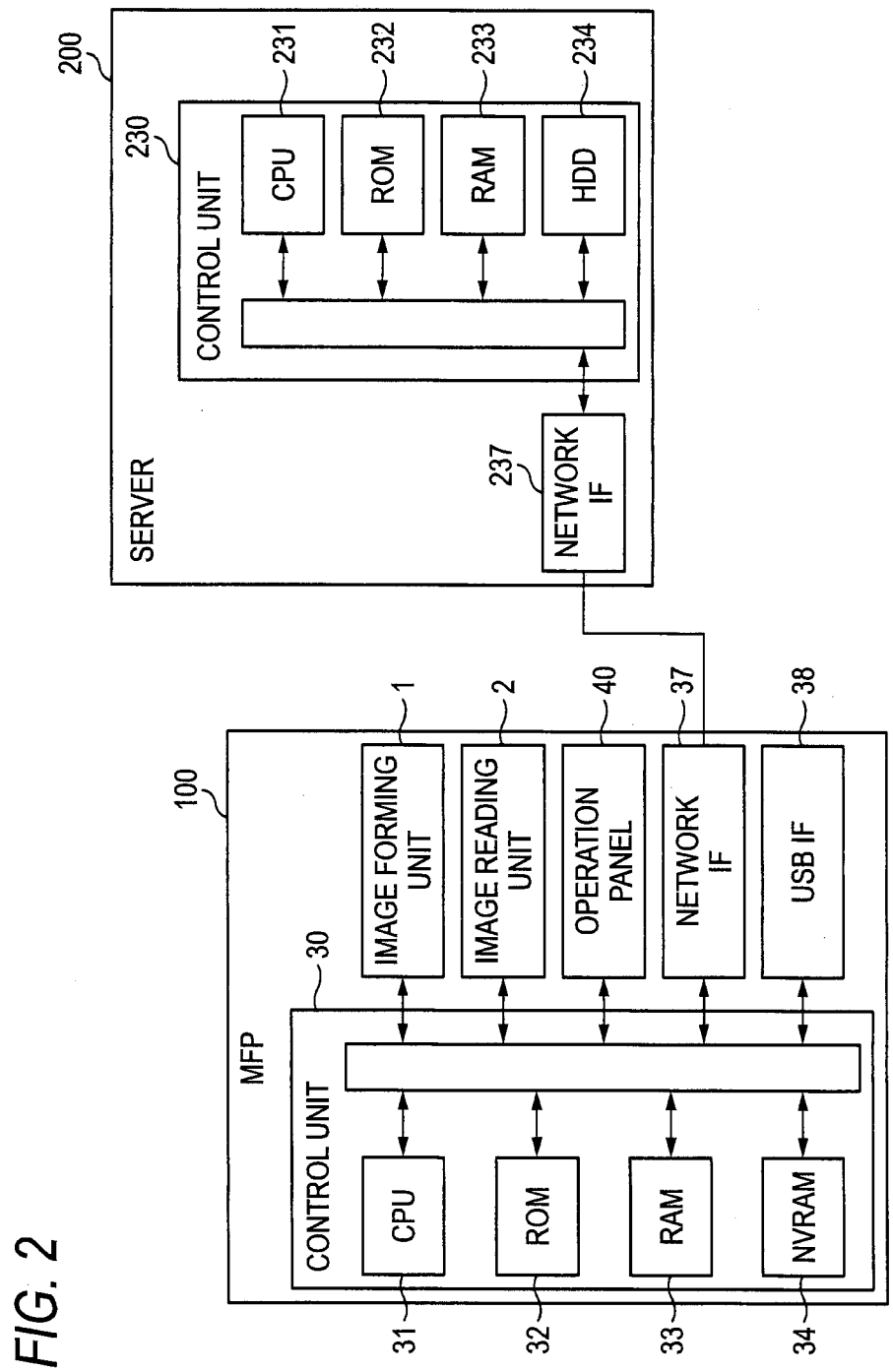
FIG. 2 is a block diagram illustrating an electrical configuration of a Multi Function Peripheral (MFP)

Next, the electrical configuration of the MFP 100 will be described. As shown in FIG. 2, the MFP 100 has a control unit 30 which includes a CPU 31, a ROM 32, a RAM 33, and a Non-Volatile RAM (NVRAM) 34. Further, the control unit 30 is electrically connected to an image forming unit 1, an image reading unit 2, an operation panel 40, a network interface 37, and a USB interface 38. A user can manipulate the operation panel 40 to operate the MFP 100.

The image forming unit 1 prints images on paper sheets. The image forming scheme of the image forming unit 1 may be, for example, an electrophotographic scheme or an inkjet scheme. Also, the image forming unit 1 may be able to form color images, or may be for forming monochrome images only. The image forming unit 1 is an example of a printing unit.

The image reading unit 2 reads images of documents. The image reading unit 2 has, for example, an image sensor. The image sensor radiates light toward a facing document, converts the reflected light from the document into an electric signal, and outputs image data of the document.

The CPU 31 performs computations for implementing various functions such as an image reading function and image forming function in the MFP 100, and is a core for image processing control. According to control programs read from the ROM 32, the CPU 31 controls each component of the MFP 100 while storing the process results in the RAM 33. Also, the CPU 31 performs image processing on image data received through the network interface 37 or the USB interface 38, for example, according to image processing programs read from the ROM 32, and performs control such that the image forming unit 1 performs a printing operation. The CPU 31 is an example of a control device.

The ROM 32 stores various control programs for controlling various components such as the image forming unit 1, various settings, initial values, etc. The RAM 33 is used as a work area into which various control programs are read, or as a storage area for temporarily storing various data. The NVRAM 34 is a non-volatile storage member, and is used as a storage area for storing various data and so on.

The network interface 37 is connected to a network. The MFP 100 is capable of data communication with other information processing apparatuses such as the server 200 or the PC 300 through the network interface 37. Also, the USB interface 38 is connected to a peripheral device capable of USB connection, for example, a flash memory. The MFP 100 is capable of data communication with external peripheral devices through the USB interface 38. The network interface 37 and the USB interface 38 are examples of a receiving unit and a transmitting unit.

Also, as shown in FIG. 2, the server 200 has a control unit 230 which includes a CPU 231, a ROM 232, a RAM 233, and a HDD 234. Further, the control unit 230 is electrically connected to a network interface 237. In the HDD 234 of the server 200, an application for browsing logs generated by the MFP 100 is incorporated.

The network interface 237 of the server 200 is connected to the network interface 37 of the MFP 100 through a network such as a LAN. The network interface 237 is an example of a storage-side receiving unit. The HDD 234 of the server 200 is a non-volatile storage device, and is an example of a storage area. The server 200 stores logs received from the MFP 100 in the HDD 234.

[Printing Process]

Next, a printing process which the CPU 31 of the MFP 100 performs will be described with reference to a flow chart of FIG. 3. The printing process is performed if the MFP 100 receives print data. Here, receiving the print data means receiving a print job command through the network interface 37 and store print data in the RAM 33, or receiving a copy command from the operation panel 40. In a case of receiving the copy command, on the basis of image data of a document read in the image reading unit 2, print data is generated in the RAM 33 and is transmitted to the image forming unit 1.

If the printing process starts, first, in STEP S101, the CPU 31 decompresses the received print data in the RAM 33, thereby generating decompressed data. The print data is data described in a PDL. The image forming unit 1 cannot use the print data described in the PDL for printing. For this reason, the CPU 31 decompresses the print data into decompressed data such as bitmap data which can be used in the image forming unit 1.

Next, in STEP S103, the CPU 31 transmits the decompressed data from the RAM 33 to the image forming unit 1 and performs control such that the image forming unit 1 prints images. The image forming unit 1 forms the images on sheets on the basis of the decompressed data. Even if the generation of the decompressed data (STEP S101) and the printing in the image forming unit 1 (STEP S103) terminate, the CPU 31 saves both of the print data and the decompressed data in the RAM 33 without deleting those data.

Subsequently, in STEP S105, the CPU 31 performs a log transmitting process. In the log transmitting process, the MFP 100 generates a log including any one of the print data, the decompressed data, compressed data obtained by compressing the decompressed data, and the like, and transmits the log to the server 200.

Specifically, in the log transmitting process, the CPU 31 determines whether data related to printing satisfies a predetermined condition. In a case of determining that the predetermined condition is satisfied, the CPU 31 transmits the print data to the server 200 in cooperation with the network interface 37. Meanwhile, in a case of determining that the predetermined condition is not satisfied, the CPU 31 transmits the decompressed data or the compressed data obtained by compressing the decompressed data to the server 200 in cooperation with the network interface 37. If the log transmitting process terminates, the CPU 31 terminates the printing process.

The decompressed data is not data described in a language such as a PDL, but general-purpose data such as bitmap data. Therefore, the decompressed data can be easier used as compared to the print data. Many image processing apparatuses can display general-purpose data such as bitmap data. However, the decompressed data is likely to have a size larger than that of the print data. For this reason, only when it is determined that the predetermined condition is not satisfied, the MFP 100 transmits the decompressed data. Therefore, in a case of transmitting print data to the server 200 with respect to at least a portion of a print job command, the degree of occupying of the HDD 234 which is a storage area of the server 200 is less as compared to a case of transmitting decompressed data with respect to all of the print job command.

Figure 3:
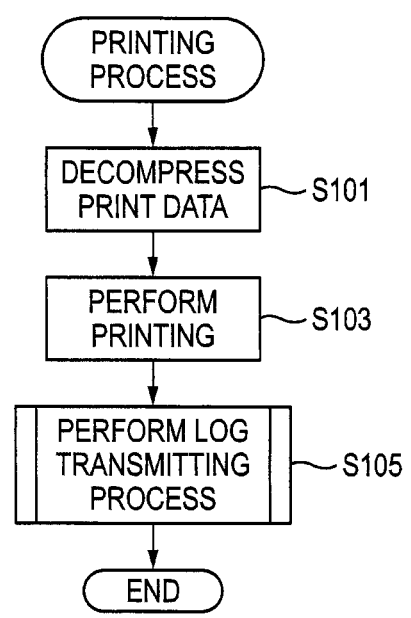
FIG. 3 is a flow chart illustrating procedure of a printing process.

Also, as shown in FIG. 3, the MFP 100 transmits the log after termination of printing. However, the present invention is not limited thereto. The log may be transmitted before printing. However, in order to avoid recording of a log of unperformed printing, it is preferable to transmit the log after printing. The reason is that in some cases such as a case where printing is stopped by the user after a print job command is received, if a log of unperformed printing is stored, since the reliability of the log is likely to decrease, it is not desirable.

[Log Transmitting Process]

Next, the log transmitting process of STEP S105 will be described in six forms of first to sixth log transmitting processes. In order to determine whether to transmit the print data, the CPU 31 determines whether the data related to printing satisfies the predetermined condition. As the predetermined condition which is determined in the log transmitting process, there is a plurality of conditions as will be described hereinafter. The individual forms use predetermined conditions different from each other.

Also, the data related to printing for the determination of the predetermined condition is data which is acquired on the basis of the print data. The data related to printing includes, for example, the size of the print data, the size of the decompressed data, the size of the compressed data obtained by compressing the decompressed data, a page range of the print job to be stored as a log, and a data type of the print data. Also, with respect to which condition is to be used, one condition may be incorporated in the MFP 100 in advance, or a plurality of conditions may be incorporated and the user or the system may select and use at least one of the plurality of conditions.

[First Log Transmitting Process]

Figure 4:
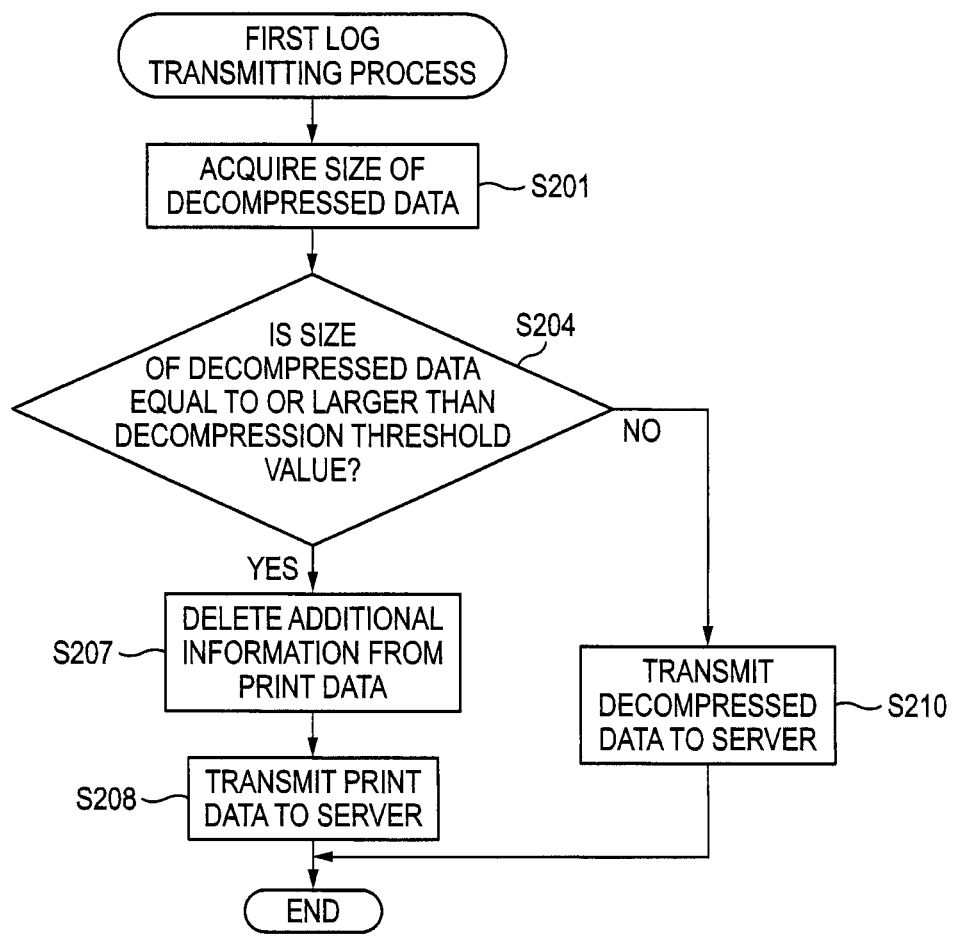
FIG. 4 is a flow chart illustrating procedure of a first log transmitting process.

First, the first log transmitting process will be described with reference to a flow chart of FIG. 4. If performance of the first log transmitting process starts, first, in STEP S201, the CPU 31 acquires the size of the decompressed data. For example, the CPU 31 computes the size of the decompressed data stored in the RAM 33, and stores the computed size of the decompressed data in the RAM 33. Then, the CPU 31 acquires the size of the decompressed data from the RAM 33.

Subsequently, in STEP S204, the CPU 31 determines whether the size of the decompressed data acquired in STEP S201 is equal to or larger than a decompression threshold value which is a predetermined threshold value. In other words, the CPU 31 reads the decompression threshold value stored in advance in the ROM 32 or the NVRAM 34 and compares the decompression threshold value with the size of the decompressed data. The decompression threshold value is a data size which may occupy a large area of the storage area of the server 200 if data having a size larger than the corresponding data size is transmitted, and is set in advance on the basis of the storage capacity of the HDD 234.

When the size of the decompressed data is equal to or larger than the decompression threshold value (Yes in STEP S204), if the decompressed data is transmitted, the decompressed data may occupy a large area of the storage area. For this reason, it is preferable to transmit the print data, not to transmit the decompressed data. In other words, in the first log transmitting process, a condition that the size of the decompressed data is equal to or larger than the decompression threshold value is used as the above described predetermined condition. In a case of determining that the predetermined condition is satisfied, the CPU 31 transmits the print data to the server 200. In other words, if the size of the decompressed data is equal to or larger than the decompression threshold value, the CPU 31 generates a log including the print data, and transmits the log.

In order to generate a log including the print data, in STEP S207, the CPU 31 deletes additional information from the received print data. The additional information is information which the PC 300 adds to transmit the print data as a job. For example, information on various printing conditions such as the number of copies, color information, and an aggregation option corresponds to the additional information. By deleting the additional information, data of only a necessary portion of the print job command, including the print data, becomes a log.

Subsequently, in STEP S208, the CPU 31 transmits the print data without the additional information to the server 200. In this way, the log including the print data is transmitted to the server 200. The server 200 stores the transmitted print data in the HDD 234. After transmitting the log to the server 200, the CPU 31 terminates the first log transmitting process.

Meanwhile, when the size of the decompressed data is smaller than the decompression threshold value (No in STEP S204), the CPU 31 determines that the predetermined condition is not satisfied. Then, in STEP S210, the CPU 31 transmits a log including the decompressed data to the server 200. When the size of the decompressed data is not so large, even if the decompressed data is transmitted, the decompressed data does not occupy the storage area so much. Therefore, it is preferable to transmit the decompressed data in favor of usability. After transmitting the log to the server 200, the CPU 31 terminates the first log transmitting process.

[Second Log Transmitting Process]

Figure 5:
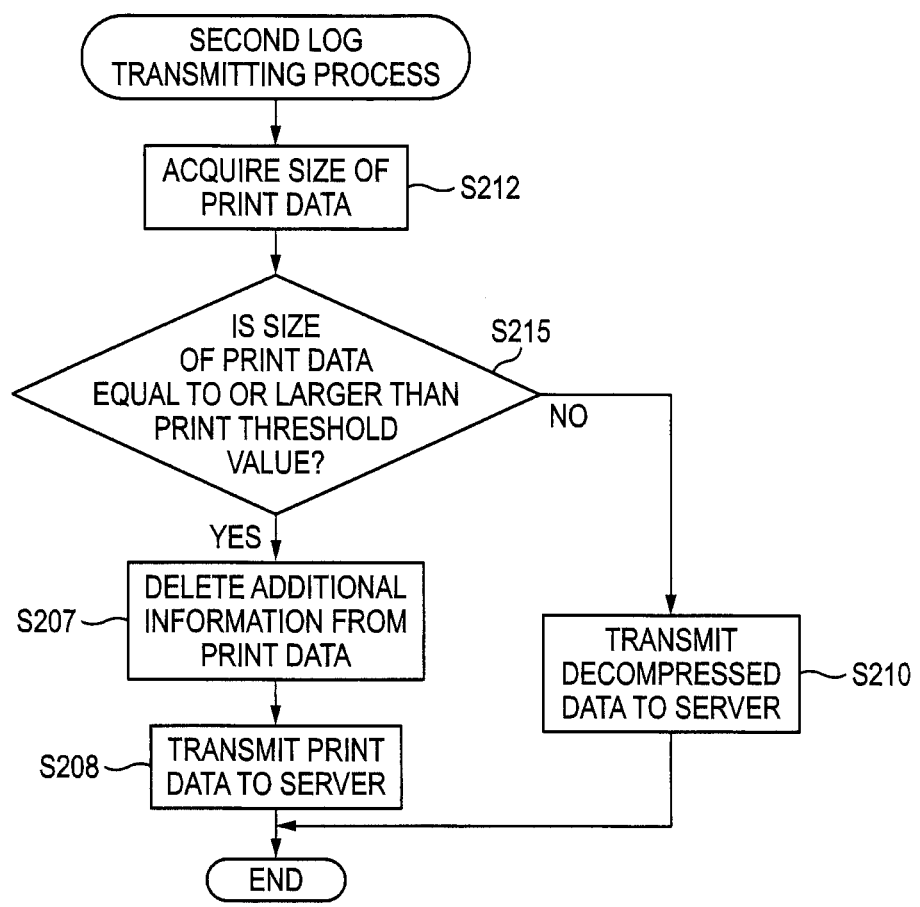
FIG. 5 is a flow chart illustrating procedure of a second log transmitting process.

Subsequently, the second log transmitting process will be described with reference to a flow chart of FIG. 5. In the second log transmitting process, the size of the print data is compared with a threshold value thereof. This point is different from the first log transmitting process in which the size of the decompressed data is compared with a threshold value. Here, processes of the same contents as those of the first log transmitting process are denoted by the same reference symbols, and will not be described.

If performance of the second log transmitting process starts, first, in STEP S212, the CPU 31 acquires the size of the print data. For example, if information on the size of the print data is included in the print job, the CPU 31 acquires the size of the print data from the print job. Alternatively, the CPU 31 computes the size of the print data stored in the RAM 33, and stores the computation result in the RAM 33. Then, the CPU 31 may acquire the size of the print data from the RAM 33.

Subsequently, in STEP S215, the CPU 31 determines whether the size of the print data acquired in STEP S212 is equal to or larger than a print threshold value which is a predetermined threshold value for the size of print data. The size of the decompressed data obtained in a case of decompressing the print data having a size larger than the print threshold value is expected to be equal to or larger than the decompression threshold value. The print threshold value is also stored in the ROM 32 or the NVRAM 34 in advance. Further, the print threshold value is smaller than the decompression threshold value.

When the size of the print data is equal to or larger than the print threshold value (Yes in STEP S215), the CPU 31 transmits the print data to the server 200. In the case where the size of the print data is equal to or larger than the print threshold value (Yes in STEP S215), since the size of the decompressed data is expected to be much larger than the size of the print data, it is preferable to transmit the print data, not to transmit the decompressed data.

Consequently, in the second log transmitting process, a condition that the size of the print data is equal to or larger than the print threshold value is used as the above-described predetermined condition. Therefore, if the size of the print data is equal to or larger than the print threshold value (Yes in STEP S215), the CPU 31 determines that the predetermined condition is satisfied. Then, the CPU 31 deletes the additional information from the print data in STEP S207, and transmits the print data without the additional information to the server 200 in STEP S208. After transmitting the log to the server 200, the CPU 31 terminates the second log transmitting process.

Meanwhile, when the size of the print data is smaller than the print threshold value (No in STEP S215), the CPU 31 determines that the predetermined condition is not satisfied. Then, in STEP S210, the CPU 31 transmits a log including the decompressed data to the server 200. When the size of the print data is not large, a possibility that the size of the decompressed data may also not be so large is high. For this reason, it is preferable to transmit the decompressed data in favor of usability. The server 200 stores the transmitted decompressed data in the HDD 234. After transmitting the log to the server 200, the CPU 31 terminates the second log transmitting process.

[Third Log Transmitting Process]

Figure 6:
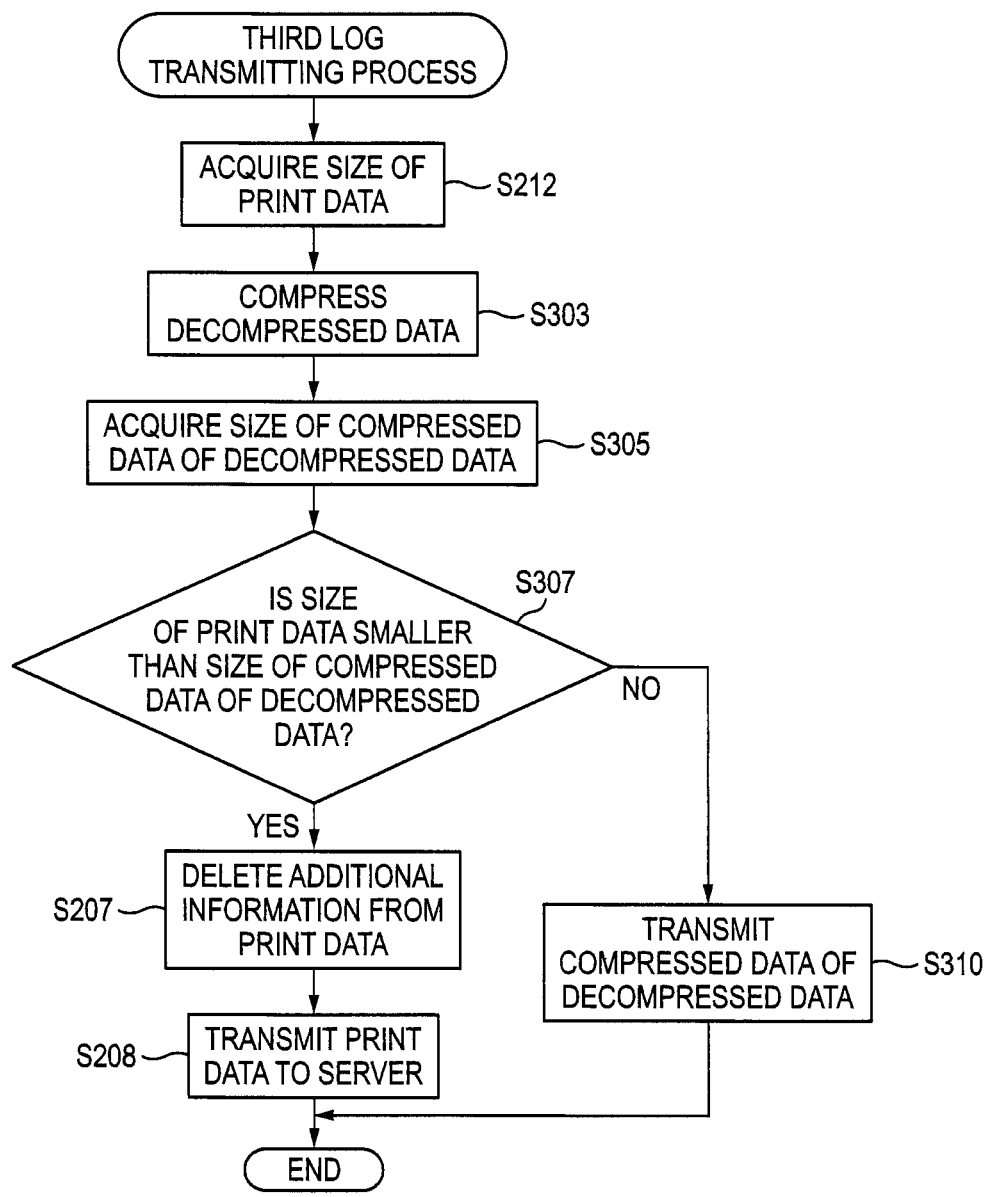
FIG. 6 is a flow chart illustrating procedure of a third log transmitting process.

Subsequently, the third log transmitting process will be described with reference to a flow chart of FIG. 6. In the third log transmitting process, the decompressed data is compressed, and the size of the compressed decompressed data is compared with the size of the print data. This point is different from the first log transmitting process and the second log transmitting process in which the size of the decompressed data or the print data is compared with a corresponding threshold value. Here, processes of the same contents as those of the first log transmitting process are denoted by the same reference symbols, and will not be described.

If performance of the third log transmitting process starts, first, in STEP S212, the CPU 31 acquires the size of the print data. Subsequently, in STEP S303, the CPU 31 compresses the decompressed data. As the compressing scheme, for example, a general scheme such as a JPEG scheme or a GIF scheme is used. Alternatively, the compressing scheme is selected from compressing schemes capable of being decompressed by the server 200. Next, in STEP S305, the CPU 31 acquires the size of the compressed decompressed data.

Subsequently, in STEP S307, the CPU 31 determines whether the size of the print data acquired in STEP S212 is smaller than the size of the compressed decompressed data acquired in STEP S305. When the size of the compressed decompressed data is larger than the size of the print data (Yes in STEP S307), it is preferable to transmit the print data.

Therefore, in the third log transmitting process, a condition that the size of the compressed decompressed data is larger than the size of the print data is used as the above described predetermined condition. When the size of the compressed decompressed data is larger than the size of the print data, the CPU 31 determines that the predetermined condition is satisfied. If it is determined that the predetermined condition is satisfied, similarly to the first log transmitting process, the CPU 31 deletes the additional information in STEP S207, and transmits the print data without the additional information to the server 200 in STEP S208.

Meanwhile, when the size of the compressed decompressed data is equal to or smaller than the size of the print data (No in STEP S307), the CPU 31 determines that the predetermined condition is not satisfied. Then, in STEP S310, the CPU 31 transmits a log including the compressed decompressed data to the server 200. If the size of the compressed decompressed data is smaller than the size of the print data, it is preferable to transmit the compressed decompressed data by the control device to reduce the degree of occupying of the storage area of the server 200. The server 200 stores the transmitted compressed decompressed data in the HDD 234. After transmitting the log to the server 200, the CPU 31 terminates the third log transmitting process.

[Fourth Log Transmitting Process]

Figure 7:
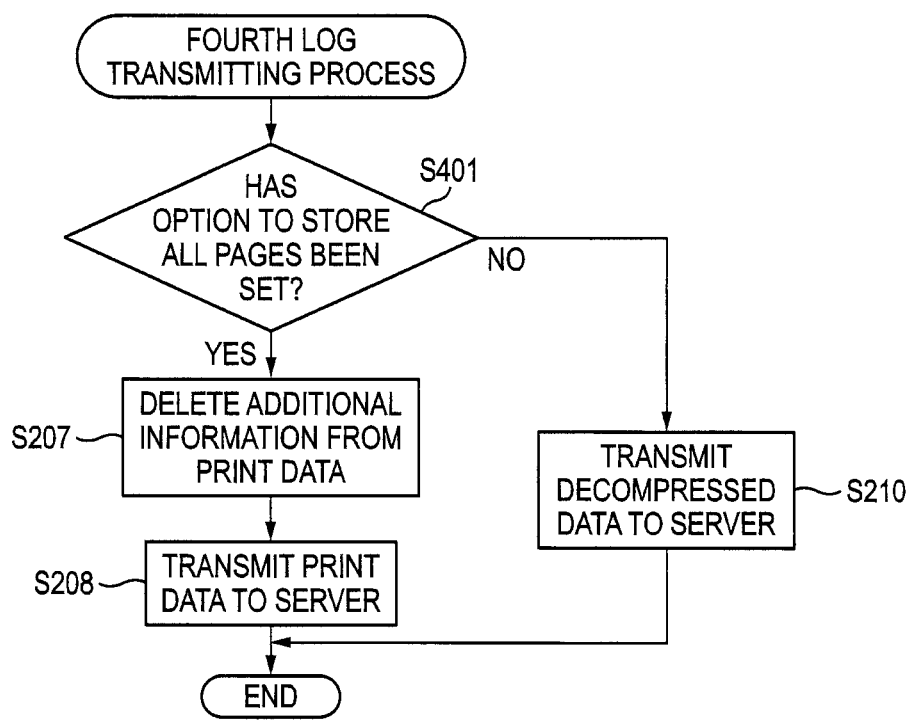
FIG. 7 is a flow chart illustrating procedure of a fourth log transmitting process.

Next, the fourth log transmitting process will be described with reference to a flow chart of FIG. 7. In the fourth log transmitting process, instead of the data sizes, it is determined whether a log setting is transmission of all pages. This point is different from the first to third log transmitting processes having data sizes as determination factors. Processes of the same contents as those of the first log transmitting process are denoted by the same reference symbols, and will not be described.

If performance of the fourth log transmitting process starts, first, in STEP S401, the CPU 31 determines whether a setting to store information corresponding to all pages included in the print job command as a log has been set. This setting is set on the basis of an instruction input of a management user of the system or the like by the CPU 31. The management user can determine whether to transmit all pages or only some pages such as the first page, as a log, and store the determination result in the MFP 100.

Also, whether to store image data of all pages as a log may be automatically determined for each print job by the MFP 100. For example, when specific character information such as "Secret" or "Confidential" is included in the images of the print job, the CPU 31 sets a setting to store image data of all pages as a log. To this end, the CPU 31 reads character information included in the received print job, and checks the character information against a specific character list.

Alternatively, whether to store image data of all pages as a log may be determined on the basis of whether the user having transmitted the print job is a user which requires attention. To this end, the MFP 100 stores a list of user IDs of users which require attention in the NVRAM 34 or the like, and checks the user ID of the user having transmitted the print job against the list. If determining that the user having transmitted the print job is a user which requires attention, the CPU 31 sets the setting to store image data of all pages as a log.

Then, when the system has been set to store all pages of the print job (Yes in STEP S401), the CPU 31 transmits the print data having a small size. In the case of storing all pages, the data size is larger as compared to a case of storing only some pages. Therefore, it is preferable to transmit the print data.

Consequently, in the fourth log transmitting process, a condition that the setting to store all pages of the print job is set is used as the above-described predetermined condition. Then, when the option to store all pages of the print job has been set, the CPU 31 determines that the predetermined condition is satisfied. If it is determined that the predetermined condition is satisfied, similarly to the first log transmitting process, the CPU 31 deletes the additional information in STEP S207, and transmits the print data without the additional information to the server 200 in STEP S208.

Meanwhile, when the setting to store all pages of the print job has not been set (No in STEP S401), the CPU 31 determines that the predetermined condition is not satisfied. Then, in STEP S210, the CPU 31 transmits a log including, for example, decompressed data of the first page, to the server 200. If there are a few pages, even if the decompressed data is stored, the decompressed data does not occupy the storage area so much. Therefore, it is preferable to transmit the decompressed data. After transmitting the log to the server 200, the CPU 31 terminates the fourth log transmitting process.

Also, the setting on whether to store all pages is not set only by the management user, but may be automatically set for each job on the basis of the contents of print data by the CPU 31. For example, on the basis of information related to the user having issued the print job command, analysis of text information including in the print data, and the like, the CPU 31 may set the setting on whether to store all pages.

[Fifth Log Transmitting Process]

Figure 8:
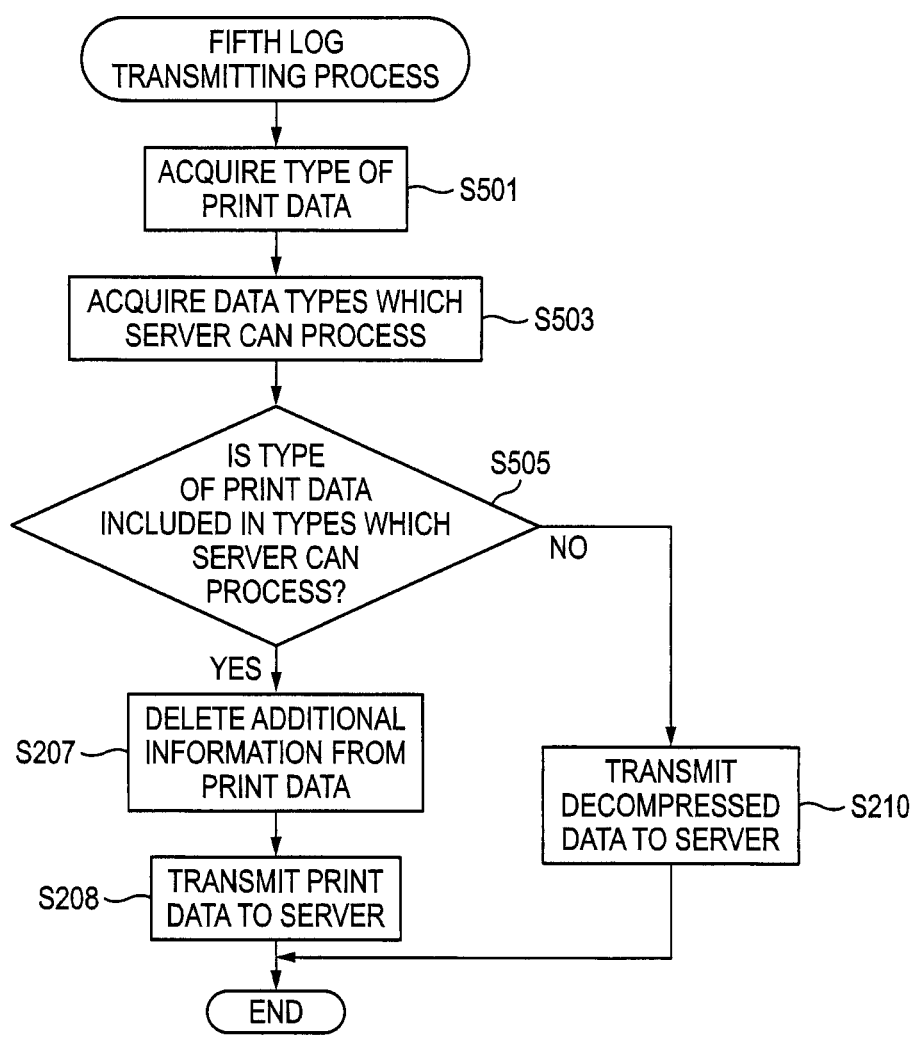
FIG. 8 is a flow chart illustrating procedure of a fifth log transmitting process.

Next, the fifth log transmitting process will be described with reference to a flow chart of FIG. 8. In the fifth log transmitting process, it is determined whether the print data can be processed by the server 200. This point is different from the first to fourth log transmitting processes having the sizes of data for transmission as determination factors. Processes of the same contents as those of the first log transmitting process are denoted by the same reference symbols, and will not be described.

If performance of the fifth log transmitting process starts, first, in STEP S501, the CPU 31 acquires the type of the print data. The type of the print data is, for example, the type of the PDL. There is a plurality of types of PDLs, and in a case of using print data described in each PDL, a decompressing program corresponding to the corresponding PDL becomes necessary. For this reason, an apparatus without the corresponding program may not properly decompress the print data.

Subsequently, in STEP S503, the CPU 31 acquires data types which can be processed by the server 200. The data types which can be processed by the server 200 may be stored in the ROM 32, or the NVRAM 34, or the like, in advance. Alternatively, during performance of STEP S503, the CPU 31 may inquire of the server 200.

Subsequently, in STEP S505, the CPU 31 determines whether the type of the print data acquired in STEP S501 is included in the data types which has been acquired in STEP S503 and can be processed by the server 200. When the type of the print data is included in the data types which can be processed by the server 200 (Yes in STEP S505), the server 200 can process the print data. That is, the server 200 can decompress the print data, and grasp the contents of printing. If the print data can be processed in the server 200, it is preferable to transmit the print data to avoid occupying a large area of the storage area.

Consequently, in the fifth log transmitting process, a condition that the type of the print data is one of the data types which can be processed by the server 200 is used as the above described-predetermined condition. When the type of the print data is included in the data types which can be processed by the server 200, the CPU 31 determines that the predetermined condition is satisfied. If it is determined that the predetermined condition is satisfied, similarly to the first log transmitting process, the CPU 31 deletes the additional information in STEP S207, and transmits the print data without the additional information to the server 200 in STEP S208.

Meanwhile, when the type of the print data is not a type which can be processed by the server 200 (No in STEP S505), it is preferable to transmit the decompressed data. The reason is that the decompressed data does not need to be processed in the server 200. Therefore, in the case where the type of the print data is not included in the data types which can be processed by the server 200, in STEP S210, the CPU 31 transmits a log based on the decompressed data to the server 200. After transmitting the log to the server 200, the CPU 31 terminates the fifth log transmitting process.

[Sixth Log Transmitting Process]

Figure 9:
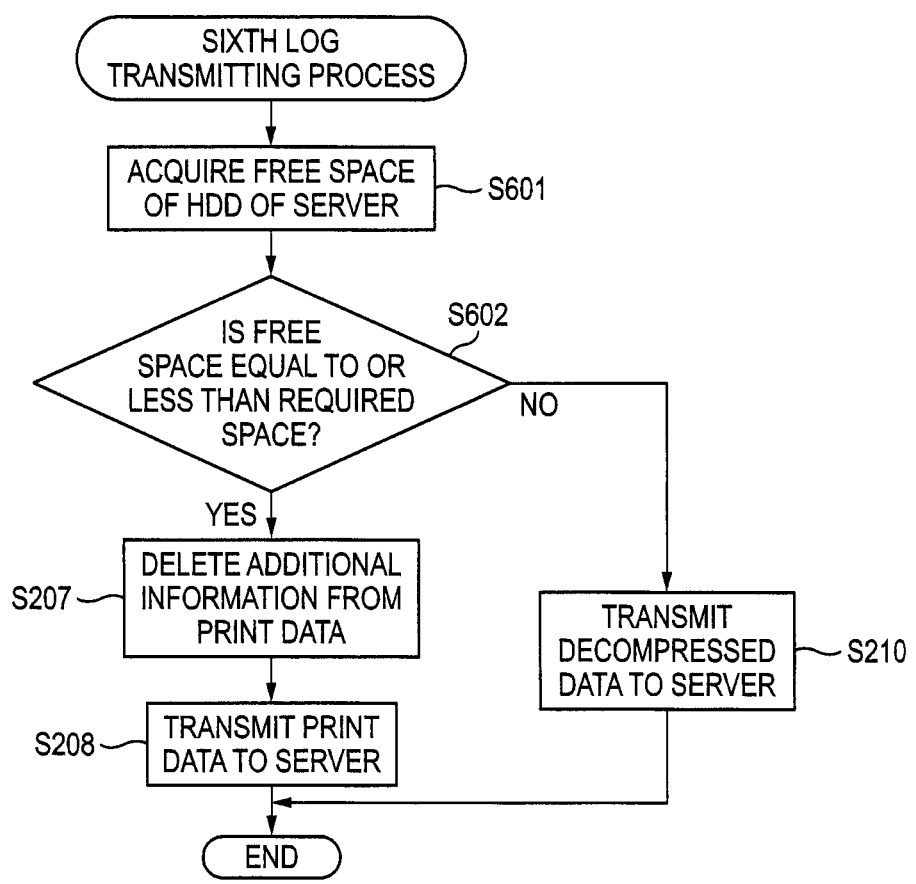
FIG. 9 is a flow chart illustrating procedure of a sixth log transmitting process.

Subsequently, the sixth log transmitting process will be described with reference to a flow chart of FIG. 9. The sixth log transmitting process uses the free space of the server 200, not a condition related to the print data, as a determination factor. Processes of the same contents as those of the first log transmitting process are denoted by the same reference symbols, and will not be described.

If performance of the sixth log transmitting process starts, first, in STEP S601, the CPU 31 acquires the free space of the HDD 234 of the server 200. The CPU 31 can acquire the free space of the HDD 234 at that time by inquiring of the server 200.

Subsequently, in STEP S602, the CPU 31 determines whether the free space of the HDD 234 acquired in STEP S601 is equal to or smaller than a predetermined required space. The required space is stored, for example, in the RAM 33 or the NVRAM 34 or the like in advance. Then, when the free space of the HDD 234 is equal to or smaller than the predetermined required space (Yes in STEP S602), it is preferable for the CPU 31 to transmit the print data having a small size.

Consequently, in the sixth log transmitting process, a condition that the free space of the HDD 234 is equal to or smaller than the required space is used as the above-described predetermined condition. Then, when the free space of the HDD 234 is equal to or smaller than the required space, the CPU 31 determines that the predetermined condition is satisfied. If it is determined that the predetermined condition is satisfied, similarly to the first log transmitting process, the CPU 31 deletes the additional information in STEP S207, and transmits the print data without the additional information to the server 200 in STEP S208.

Meanwhile, when the free space of the HDD 234 is larger than the required space (No in STEP S602), it is preferable to transmit the decompressed data in favor of usability. Therefore, in the case where the free space of the HDD 234 is larger than the required space, in STEP S210, the CPU 31 transmits a log based on the decompressed data to the server 200. After transmitting the log to the server 200, the CPU 31 terminates the sixth log transmitting process.

In the MFP 100 of the present embodiment, the CPU 31 performs one of the six forms of log transmitting processes described above, thereby transmitting a log which is generated by selecting one from the print data, the decompressed data, and the compressed data of the decompressed data. In this way, it is possible to transmit appropriate data to the server 200 on the basis of the predetermined condition.

As described above in detail, according to the MFP 100, if a print job command is received, print data or decompressed data is transmitted to the server 200 and is stored in the HDD 234. In this case, the CPU 31 determines whether data related to the print data satisfies the predetermined condition, and transmits the print data in a case of determining that the predetermined condition is satisfied. In other words, in the case where the predetermined condition is satisfied, the undecompressed print data having a small data size is transmitted to the storage device, and if the predetermined condition is not satisfied, the decompressed data having a large data size is transmitted to the storage device. Therefore, as compared to a case where all decompressed data is transmitted, it is possible to suppress occupying a large area of the storage area of the storage device.

The present embodiment is merely an example, and does not limit the present invention. Therefore, the present invention can be improved and modified in various forms without departing from the scope.

For example, the present invention is not limited to the MFP, but is applicable to any apparatuses having an image forming function, such as a copy machine, a printer, and a FAX. The present invention can also be applied to printing apparatuses which do not include the image reading unit 2. Also, the storage device is not limited to the server 200 connected to the MFP 100 through the network. The storage device may be a storage device externally attached to or built in the MFP 100. Also, the NVRAM 34 of the MFP 100 may be the log storage destination. In this case, the NVRAM 34 becomes an example of the storage device.

Also, for example, in FIG. 1 of the above described embodiment, one MFP 100, one server 200, and one PC 300 are shown. However, a plurality of MFPs, servers, or PCs may be included. Also, the server 200 and the PC 300 may be directly connected. Also, for example, in the case of transmitting the print data, the additional information is deleted in advance, and then the print data is transmitted. However, the print data may be transmitted without deleting the additional information, and the additional information may be deleted in the server 200.

Also, the processes disclosed in the embodiment may be performed by a single CPU, a plurality of CPUs, hardware such as an ASIC, or a combination thereof. Further, the processes disclosed in the embodiment can be implemented in various forms such as a recording medium having programs for performing those processes stored therein, or methods of performing those processes.

The present invention provides illustrative, non-limiting examples as follows:

(1) In a first aspect, there is provided a printing apparatus including: a receiving unit configured to receive print data; a printing unit configured to print image obtained from decompressed data, which is obtained by decompressing the print data, on a sheet; a transmitting unit configured to transmit data to a storage device to which a log related to printing is configured to be stored; and a control device configured to: decompress the print data into the decompressed data; and determine whether data related to the printing satisfies a predetermined condition; wherein, if the control device determines that the predetermined condition is satisfied, the transmitting unit transmits the print data to the storage device, and if the determining unit determines that the predetermined condition is not satisfied, the transmitting unit transmits the decompressed data to the storage device.

According to the first aspect, the printing apparatus determines whether the data related to printing satisfies the predetermined condition, and transmits either the print data or the decompressed data on the basis of the determination result. The decompressed data is data such as bitmap data obtained by decompressing the print data described in, for example, a Page Description Language (PDL), and thus is easily used. On the other hand, the decompressed data has a tendency to have a large data size. For this reason, if the data related to printing satisfies the predetermined condition, the undecompressed print data having a small data size is transmitted to the storage device, and if the data related to printing does not satisfy the predetermined condition, the decompressed data having a large data size is transmitted to the storage device.

Here, the data related to printing is data based on the print data. For example, the data related to printing is the print data, the decompressed data obtained by decompressing the print data, compressed data obtained by compressing the decompressed data, etc. Further, the predetermined condition corresponds to a condition that the size of the data related to printing is equal to or larger than a threshold value, a condition that printing logs of all pages are necessary, or a condition that the print data is a specific type of data.

Further, if the data related to printing satisfies the predetermined condition, the print data is transmitted. Therefore, an amount of data for transmission is smaller as compared to a case of transmitting all decompressed data. Therefore, reducing occupying of the storage area of the storage device as a log storage destination can be expected.

The printing apparatus may receive the print data from an external apparatus through a network, or may receive the print data from a scanner unit such as a copy unit included in the printing apparatus. Further, the print data or the decompressed data may be transmitted before printing or after printing. However, in order to avoid recording of a log of unperformed printing due to cancel of printing, it is preferable to transmit the data after printing. The storage device may be an external server which is connected through a network, or a built-in server.

(2) In a second aspect, there is provided the printing apparatus according to the first aspect, wherein, if a size of the decompressed data is equal to or larger than a decompression threshold value for the size of decompressed data, the control device determines that the predetermined condition is satisfied.

The decompression threshold value is, for example, a data size which may occupy a large area of the storage area of the storage device in a case of transmitting decompressed data having the corresponding data size as a log, and the decompression threshold value is stored in advance. In other words, in the case where the decompressed data is equal to or larger than the decompression threshold value, if the decompressed data is transmitted to the storage device, the decompressed data may occupy a large area of the storage area of the storage device. For this reason, if the size of the decompressed data is equal to or larger than the decompression threshold value, it is preferable to transmit the undecompressed print data rather than the decompressed data.

(3) In a third aspect, there is provided the printing apparatus according to the first aspect, wherein, if a size of the print data is equal to or larger than a print threshold value for the size of print data, the control device determines that the predetermined condition is satisfied.

When the size of print data is large, the size of decompressed data is also expected to be large. For this reason, if the size of print data is equal to or larger than the print threshold value, it is preferable to transmit the undecompressed print data rather than decompressed data.

(4) In a fourth aspect, there is provided the printing apparatus according to the first aspect, wherein the control device is further configured to compress the decompressed data into compressed data, wherein, if a size of the compressed data is larger than a size of the print data, the control device determines that the predetermined condition is satisfied, and wherein if the control device determines that the predetermined condition is satisfied, the transmitting unit transmits the print data to the storage device, and if the control device determines that the predetermined condition is not satisfied, the transmitting unit transmits the decompressed data compressed by the control device to the storage device.

When the decompressed data is compressed and the size of the compressed data is smaller than the size of the print data, if the compressed data of the decompressed data is transmitted, a possibility of occupying a large area of the storage area of the storage device is low. Here, the compressing scheme may be a general compressing scheme such as JPEG.

(5) In a fifth aspect, there is provided the printing apparatus according to the first aspect, wherein the control device is further configured to set an setting on whether to store all pages of a print job based on the print data in the storage device, and wherein, if the control device has set the setting to store all pages in the storage device, the control device determines that the predetermined condition is satisfied.

In a case of storing all pages of the print job, the size of data to be transmitted to the storage device is larger as compared to the other cases (for example, a case of storing only the first page). For this reason, it is preferable to transmit the uncompressed print data rather than the decompressed data. Here, the setting of whether to store all pages may be set by a user, or may be automatically set by the printing apparatus on the basis of the contents of the print data (analysis of user information or text information).

(6) In a sixth aspect, there is provided the printing apparatus according to the first aspect wherein, if a data type of the print data is one of data types which can be processed by the storage device, the control device determines that the predetermined condition is satisfied.

When it is possible to process the print data by the storage device, even if the print data is transmitted, inconvenience is hardly caused at the storage device side. Therefore, it is preferable to transmit the print data to avoid occupying of a large area of the storage area. As the method of acquiring the data types which can be processed by the storage device, the printing apparatus may include a database storing the data types which can be processed by the storage device and the data types may be acquired from the database. Alternatively, the data types may be acquired by inquiring the storage device on a case-by-case basis.

(7) In a seventh aspect, there is provided a printing apparatus including: a receiving unit configured to receive print data; a printing unit configured to print image obtained from decompressed data, which is obtained by decompressing the print data, on a sheet; a transmitting unit configured to transmit data to a storage device to which a log related to printing is configured to be stored; and a control device configured to: decompress the print data into the decompressed data; acquire a free space of a storage area of the storage device; and determine whether the acquired free space is equal to or less than a required space; wherein, if the control device determines that the free space is equal to or smaller than the required space, the transmitting unit transmits the print data to the storage device, and if the control device determines that the free space is larger than the required space, the transmitting unit transmits the decompressed data to the storage device.

In the case where the free space of the storage area of the storage device which becomes a log storage destination is larger than the required space, even if the decompressed data is transmitted, the decompressed data is unlikely to occupy a large area of the storage area of the storage device. Meanwhile, in the case where it is determined that the free space is equal to or smaller than the required space, since the print data is transmitted, avoiding occupying of a large area of the storage area can be expected.

(8) In an eighth aspect, there is provided a printing system including: a printing apparatus; and a storage device configured to perform communication with the printing apparatus, wherein the printing apparatus includes: a receiving unit configured to receive print data; a printing unit configured to print image obtained from decompressed data, which is obtained by decompressing the print data, on a sheet; a transmitting unit configured to transmit data to the storage device; and a control device configured to: decompress the print data into the decompressed data; and determine whether data related to the printing satisfies a predetermined condition, wherein, if the control device determines that the predetermined condition is satisfied, the transmitting unit transmits the print data to the storage device, and if the determining unit determines that the predetermined condition is not satisfied, the transmitting unit transmits the decompressed data to the storage device, and wherein the storage device includes: a storage-side receiving unit configured to receive the print data or the decompressed data transmitted from the printing apparatus; and a storage area configured to store the data received by the storage-side receiving unit.

What is claimed is:

1. A printing apparatus comprising:
  a network interface configured to communicate with a server, the server being configured to store a log related to printing;
  an image forming device configured to print an image on a sheet;
  a memory; and
  a a processor comprising hardware configured to:
  receive print data through the network interface:
  generate decompressed data by decompressing the print data;
  store both print data and decompressed data in the memory;
  cause the image forming device to print the image by using the decompressed data on the sheet;
    after printing is finished, acquire the size of the decompressed data;
    compare the size of the acquired decompressed data with the threshold value;
  determine whether the size of the acquired decompressed data is equal to or larger than the threshold value, generate a reduced print data responsive to a determination of the size of the acquired decompressed data being equal to or larger than the threshold value; and
    transmit the reduced print data to the server through the network interface without transmitting the decompressed data to the server responsive to the determination of the size of the acquired decompressed data being equal to or larger than the threshold value.

2. A printing apparatus comprising:
  a network interface configured to communicate with a server, the server being configured to store a log related to printing;
  an image forming device configured to print an image on a sheet;
  a memory; and
  a processor comprising hardware configured to:
  receive print data through the network interface;
  generate decompressed data by decompressing the print data,
  store both the print data and the decompressed data in the memory;
  cause the image forming device to print the image by using the decompressed data on the sheet;
  acquire a free space of a storage area of the external device;

determine whether the free space of the storage area is equal to or smaller than a required space after the printing by the image forming unit has terminated;

generate a reduced print data responsive to a determination that the free space of the storage area is equal to or smaller than the required space; and transmit the reduced print data to the server using the network interface without transmitting the decompressed data to the server responsive to a determination that the free space of the storage area is equal to or smaller than the required space.

3. A printing system comprising:

a printing apparatus; and a server configured to perform communication with the printing apparatus, wherein the printing apparatus includes:

a network interface configured to communicate with the server;

an image forming device configured to print an image on a sheet;

a memory; and a processor comprising hardware configured to:

receive print data through the network interface;

generate decompressed data by decompressing the print data, store both the print data and the decompressed data in the memory;

cause the image forming device to print the image by using the decompressed data;

after the printing is finished, acquire the size of the decompressed data;

compare the size of the acquired decompressed data with a threshold value;

determine whether the size of the acquired decompressed data is equal to or larger than the threshold value, generate a reduced print data responsive to a determination of the size of the acquired decompressed data being equal to or larger than the threshold value; and transmit the reduced print data to the server through the network interface without transmitting the decompressed data to the server responsive to a determination of the size of the acquired decompressed data being equal to or larger than the threshold value;

wherein the external device includes:

a storage-side receiving unit configured to: receive the reduced print data or the decompressed data; and a storage area configured to store the data received by the storage-side receiving unit.

4. The printing apparatus according to claim 1, wherein the processor comprising hardware is further configured to transmit the decompressed data to the server through the network interface without transmitting the print data to the server responsive to a determination of the size of the acquired decompressed data being smaller than the threshold value.

5. The printing apparatus according 1, wherein the reduced print data is generated by removing additional information from the print data.

6. The printing apparatus according to claim 2, wherein the processor comprising hardware is further configured to transmit the decompressed data to the server by using the network interface without transmitting the print data to the server responsive to a determination that the free space of the storage area is larger than the required space.

7. The printing apparatus according to claim 2, wherein the reduced print data is generated by removing additional information from the print data.

8. The printing apparatus according to claim 3, wherein the processor comprising hardware is further configured to transmit the decompressed data to the server through the network interface without transmitting the print data to the server responsive to a determination of the size of the acquired decompressed data being smaller than the threshold value.

9. The printing apparatus according to claim 3, wherein the reduced print data is generated by removing additional information from the print data.

* * * * *